(12) United States Patent
Nakasu et al.

(10) Patent No.: US 12,427,658 B2
(45) Date of Patent: Sep. 30, 2025

(54) CONTROL DEVICE, CONTROL METHOD, AND ROBOT SYSTEM

(71) Applicant: HITACHI, LTD., Tokyo (JP)

(72) Inventors: Nobuaki Nakasu, Tokyo (JP); Kaichiro Nishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 447 days.

(21) Appl. No.: 17/777,651

(22) PCT Filed: Sep. 8, 2020

(86) PCT No.: PCT/JP2020/033855
§ 371 (c)(1),
(2) Date: May 18, 2022

(87) PCT Pub. No.: WO2021/106307
PCT Pub. Date: Jun. 3, 2021

(65) Prior Publication Data
US 2022/0324099 A1 Oct. 13, 2022

(30) Foreign Application Priority Data

Nov. 27, 2019 (JP) .................... 2019-213975

(51) Int. Cl.
*B25J 9/16* (2006.01)
*B25J 9/02* (2006.01)

(52) U.S. Cl.
CPC .............. *B25J 9/163* (2013.01); *B25J 9/023* (2013.01); *B25J 9/161* (2013.01); *B25J 9/1612* (2013.01); *B25J 9/1633* (2013.01); *B25J 9/1664* (2013.01)

(58) Field of Classification Search
CPC ... B25J 9/163; B25J 9/023; B25J 9/161; B25J 9/1612; B25J 9/1633; B25J 9/1664
See application file for complete search history.

(56) References Cited

U.S. PATENT DOCUMENTS 11,511,420 B2   11/2022  Toda
2010/0023164 A1*  1/2010  Yoshizawa ............. B25J 9/1664
                                                901/50
(Continued)

FOREIGN PATENT DOCUMENTS

CN   107825422 A   3/2018
JP   05-158519 A   6/1993
(Continued)

OTHER PUBLICATIONS

International Search Report of PCT/JP2020/033855 dated Nov. 17, 2020.
(Continued)

*Primary Examiner* — Khoi H Tran
*Assistant Examiner* — Tristan J Greiner
(74) *Attorney, Agent, or Firm* — MATTINGLY & MALUR, PC

(57) ABSTRACT

Various gripped objects having different sizes, weights, centers of gravity, and the like are continuously and stably moved at a high speed. A control device includes: a state information generation unit that generates and updates state information on a robot and a gripped object; and a control information generation unit that generates, based on the state information and a base trajectory generated in advance on which the robot is configured to move the gripped object from a start point to an end point, control information for controlling the robot.

8 Claims, 12 Drawing Sheets

(56) References Cited

U.S. PATENT DOCUMENTS

| | | | |
|---|---|---|---|
| 2011/0035051 A1* | 2/2011 | Kim | B25J 9/1666 |
| | | | 901/1 |
| 2016/0263744 A1* | 9/2016 | Dzierzega | B25J 9/1664 |
| 2018/0079076 A1* | 3/2018 | Toda | G05B 13/029 |
| 2018/0281191 A1* | 10/2018 | Sinyavskiy | A47L 11/4061 |
| 2020/0166896 A1* | 5/2020 | Clune | G06V 20/56 |
| 2020/0198140 A1* | 6/2020 | Dupuis | G01C 21/20 |
| 2020/0206924 A1* | 7/2020 | Pivac | B25J 19/022 |

FOREIGN PATENT DOCUMENTS

| | | | | |
|---|---|---|---|---|
| JP | 08-54919 A | | 2/1996 | |
| JP | 2005-001055 A | | 1/2005 | |
| JP | 2008279549 A | * | 11/2008 | B25J 9/1687 |
| JP | 2015-168053 A | | 9/2015 | |
| JP | 2018-043338 A | | 3/2018 | |
| JP | 2019-089201 A | | 6/2019 | |

OTHER PUBLICATIONS

Chinese Office Action received in corresponding Chinese Application No. 202080073568.X dated Apr. 14, 2023.
Japanese Office Action received in corresponding Japanese Application No. 2019-213975 dated Jan. 17, 2023.

* cited by examiner

[FIG. 1]
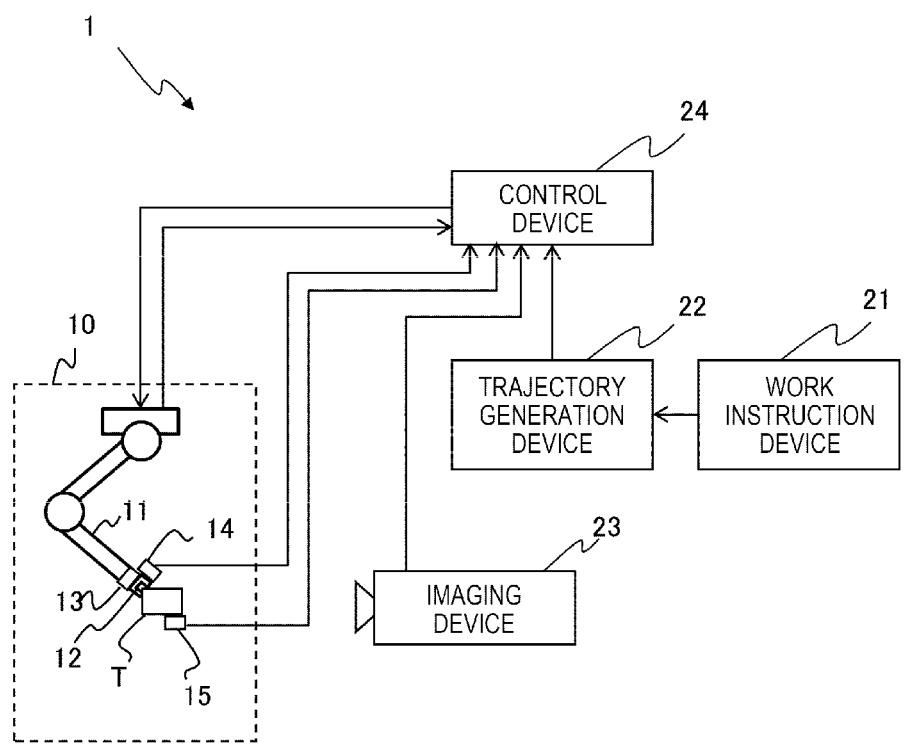

[FIG. 2]
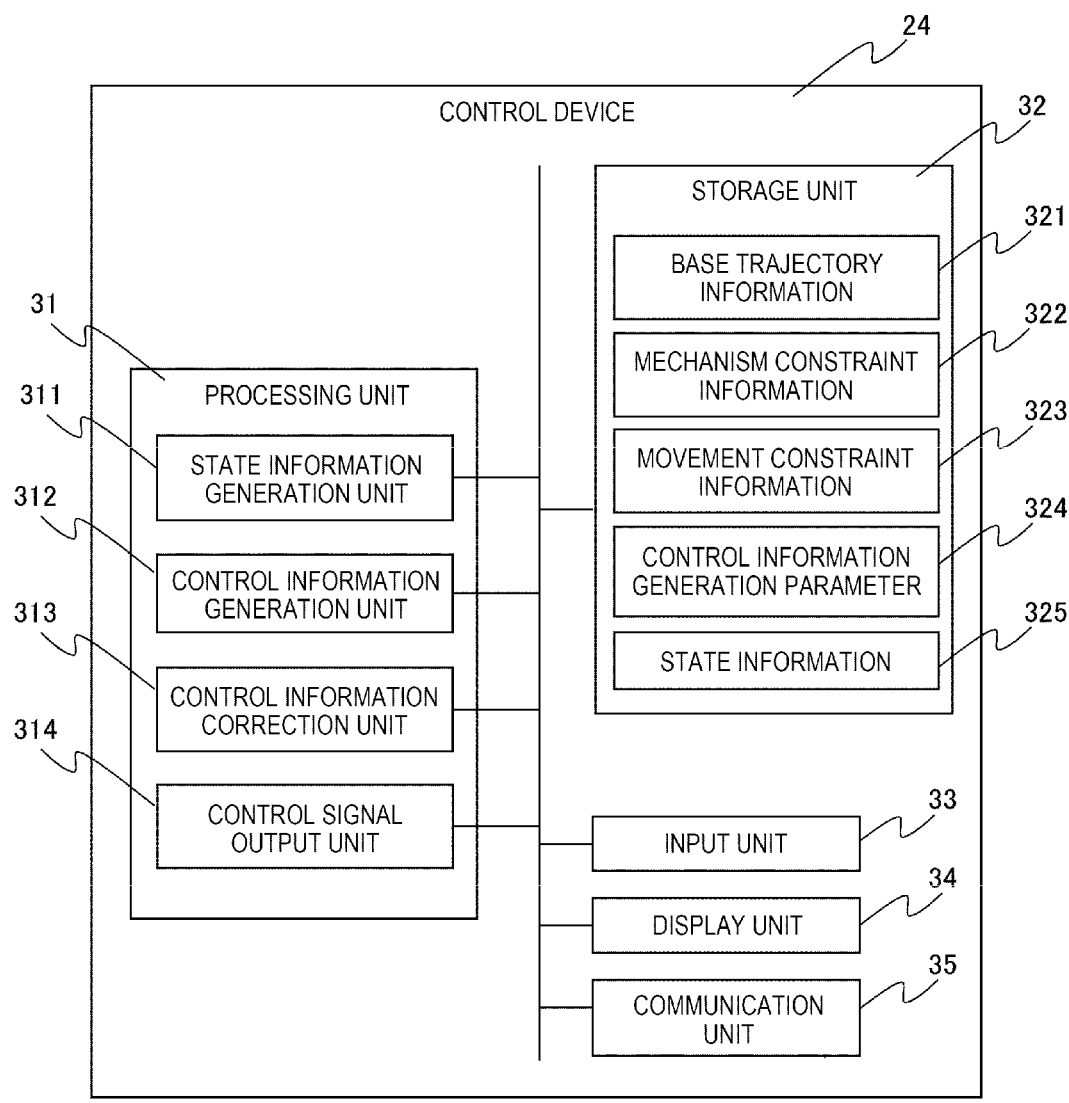

[FIG. 3]
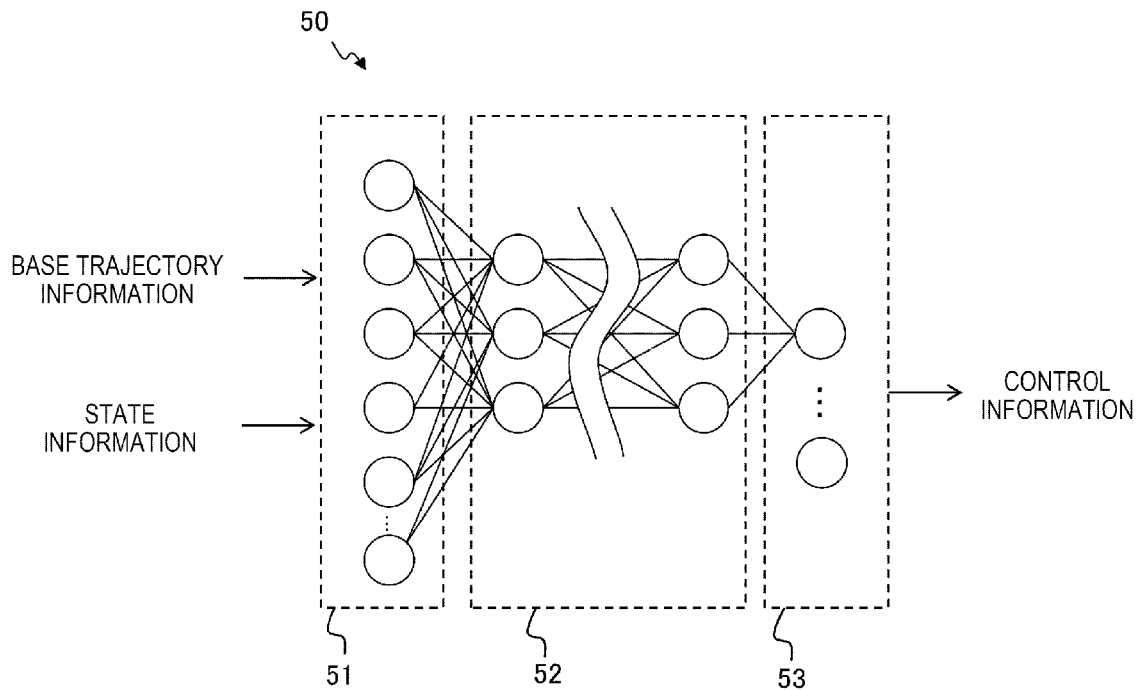
[FIG. 4]
| No | SAMALL ITEM | EXAMPLE |
|---|---|---|
| 1 | CARTESIAN COORDINATE | (100,12,400,0,90,20) |
| 2 | CARTESIAN COORDINATE | (100,12,410,0,90,30) |
| 3 | CARTESIAN COORDINATE | (100,12,440,0,90,40) |
| 4 | CARTESIAN COORDINATE | (100,42,450,0,90,50) |
| 5 | CARTESIAN COORDINATE | (100,112,460,0,90,60) |
| 6 | CARTESIAN COORDINATE | (100,120,470,0,90,70) |
| 7 | JOINT COORDINATE | (30,100,245,0,90,0) |
| 8 | JOINT COORDINATE | (30,110,245,10,90,0) |
| 9 | JOINT COORDINATE | (30,120,285,20,90,0) |
| 10 | JOINT COORDINATE | (30,130,305,30,90,0) |
| 11 | JOINT COORDINATE | (30,130,315,40,90,0) |

| No | LARGE ITEM | MEDIUM ITEM | SMALL ITEM | EXAMPLE |
|---|---|---|---|---|
| 1 | ROBOT MODEL INFORMATION | THE NUMBER OF LINKS | — | 7 |
| 2 | | LINK DIMENSION | L1 | (400, 400, 400) |
| 3 | | | L2 | (400, 400, 300) |
| 4 | | | L3 | (200, 200, 600) |
| 5 | | | L4 | (100, 100, 100) |
| 6 | | | L5 | (100, 100, 600) |
| 7 | | | L6 | (80, 80, 100) |
| 8 | | | L7 | (50, 50, 50) |
| 9 | | LINK CONNECTION INFORMATION | JOINT 1 | (L1, L2, ROTATE) |
| 10 | | | JOINT 2 | (L2, L3, ROTATE) |
| 11 | | | JOINT 3 | (L3, L4, ROTATE) |
| 12 | | | JOINT 4 | (L4, L5, ROTATE) |
| 13 | | | JOINT 5 | (L5, L6, ROTATE) |
| 14 | | | JOINT 6 | (L6, L7, ROTATE) |
| 15 | | JOINT MOVABLE RANGE | JOINT 1 | −200 ~ 200 |
| 16 | | | JOINT 2 | −180 ~ 180 |
| 17 | | | JOINT 3 | −90 ~ 180 |
| 18 | | | JOINT 4 | −180 ~ 180 |
| 19 | | | JOINT 5 | −180 ~ 180 |
| 20 | | | JOINT 6 | −360 ~ 360 |
| 21 | | LINK MODEL INFORMATION | JOINT 1 | MESH DATA (STL FORM) |
| 22 | | | JOINT 2 | MESH DATA (STL FORM) |
| 23 | | | JOINT 3 | MESH DATA (STL FORM) |
| 24 | | | JOINT 4 | MESH DATA (STL FORM) |
| 25 | | | JOINT 5 | MESH DATA (STL FORM) |
| 26 | | | JOINT 6 | MESH DATA (STL FORM) |
| 27 | ENVIRONMENT MODEL INFORMATION | WORKBENCH MODEL | MODEL | MESH DATA (STL FORM) |
| 28 | | | COORDINATE | (10,102,30,0,90,0) |
| 29 | GRIPPED OBJECT INFORMATION | GRIPPED OBJECT MODEL INFORMATION | BOX | MESH DATA (STL FORM) |
| 30 | | POSTURE CONSTRAINT INFORMATION | ANGLE | 30 |

| No | LARGE ITEM | MEDIUM ITEM | SMALL ITEM | EXAMPLE |
|---|---|---|---|---|
| 1 | KINEMATICS CONSTRAINT CONDITION | ROBOT MAXIMUM ANGULAR SPEED | JOINT 1 | 200 |
| 2 | | | JOINT 2 | 200 |
| 3 | | | JOINT 3 | 200 |
| 4 | | | JOINT 4 | 400 |
| 5 | | | JOINT 5 | 400 |
| 6 | | | JOINT 6 | 400 |
| 7 | | ROBOT MAXIMUM ANGULAR ACCELERATION | JOINT 1 | 2000 |
| 8 | | | JOINT 2 | 2000 |
| 9 | | | JOINT 3 | 2000 |
| 10 | | | JOINT 4 | 5000 |
| 11 | | | JOINT 5 | 5000 |
| 12 | | | JOINT 6 | 5000 |
| 13 | | GRIPPED OBJECT MAXIMUM SPEED | — | (30, 100, 50, 90, 90, 90) |
| 14 | | GRIPPED OBJECT MAXIMUM ACCELERATION | — | (300, 1000, 500, 900, 900, 900) |
| 15 | MECHANICAL CONSTRAINT CONDITION | GRIPPED OBJECT MAXIMUM INERTIAL FORCE | — | (200, 200, 200, 50, 50, 50) |
| 16 | | HAND MAXIMUM GRIPPING FORCE | — | 1000 |
| 17 | | HAND MAXIMUM REACTION FORCE | — | 1200 |
| 18 | | MAXIMUM TORQUE | JOINT 1 | 6000 |
| 19 | | | JOINT 2 | 5000 |
| 20 | | | JOINT 3 | 5000 |
| 21 | | | JOINT 4 | 3000 |
| 22 | | | JOINT 5 | 3000 |
| 23 | | | JOINT 6 | 2000 |
| 24 | | MAXIMUM CURRENT | JOINT 1 | 5 |
| 25 | | | JOINT 2 | 5 |
| 26 | | | JOINT 3 | 4 |
| 27 | | | JOINT 4 | 3 |
| 28 | | | JOINT 5 | 2 |
| 29 | | | JOINT 6 | 1 |

[FIG. 7]
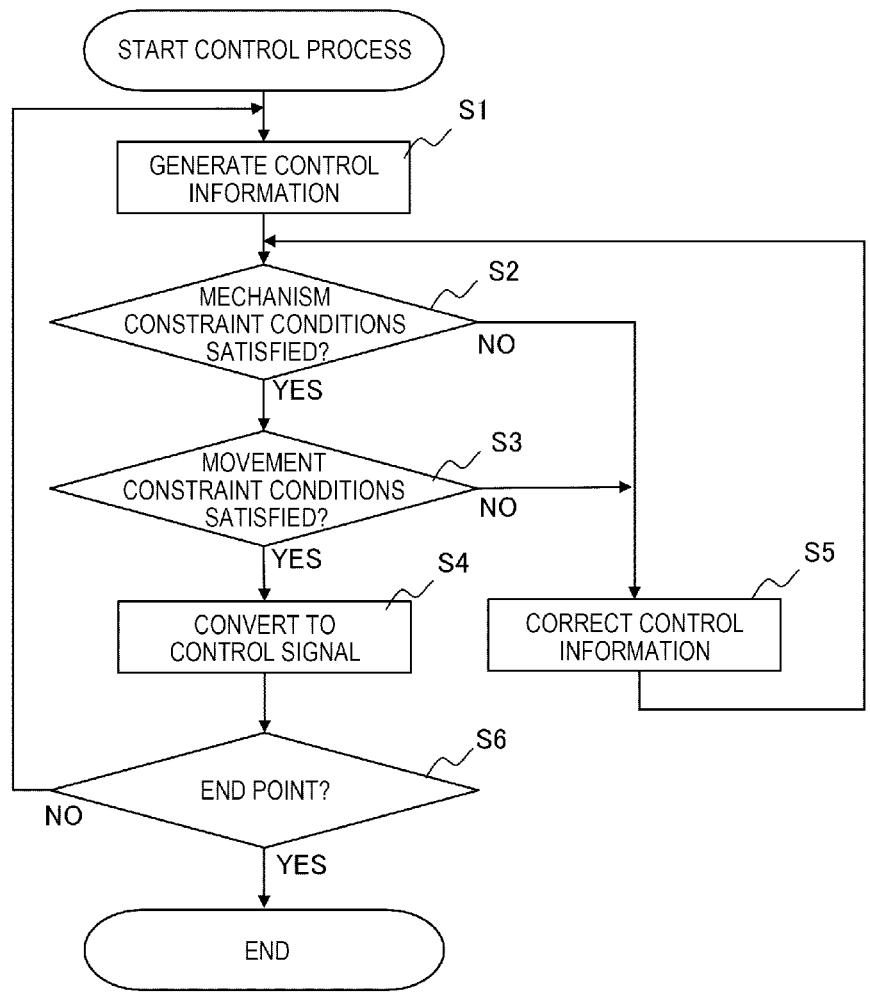

[FIG. 8]
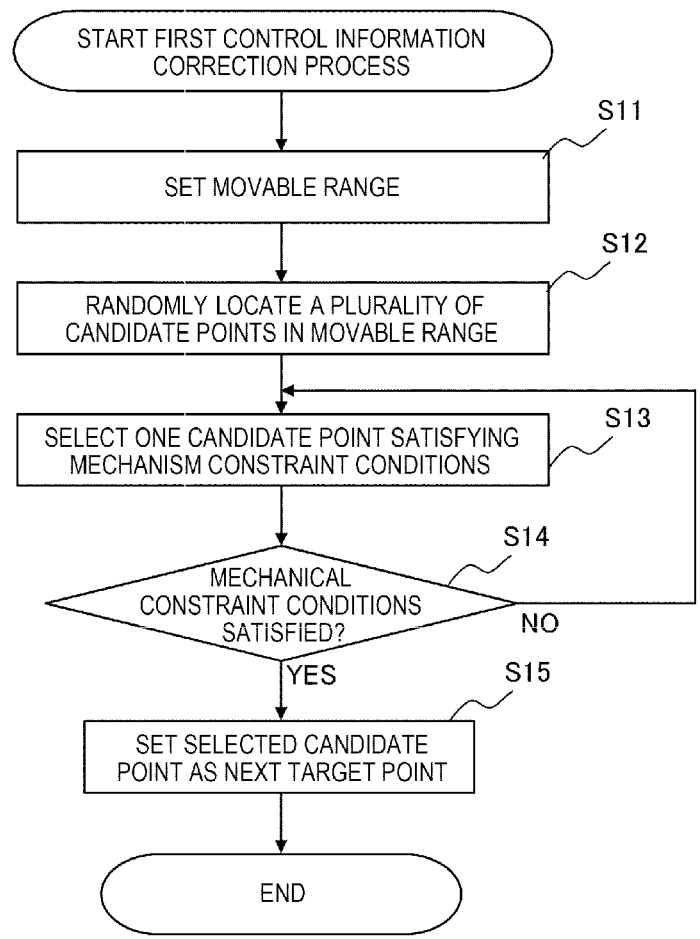
[FIG. 9]
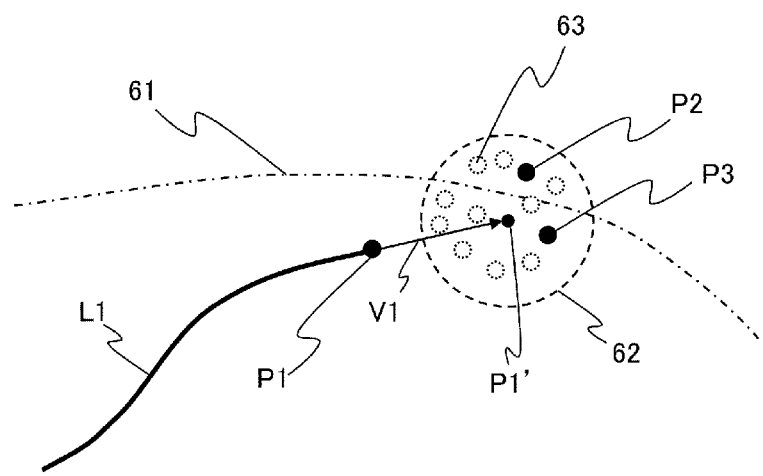

[FIG. 10]
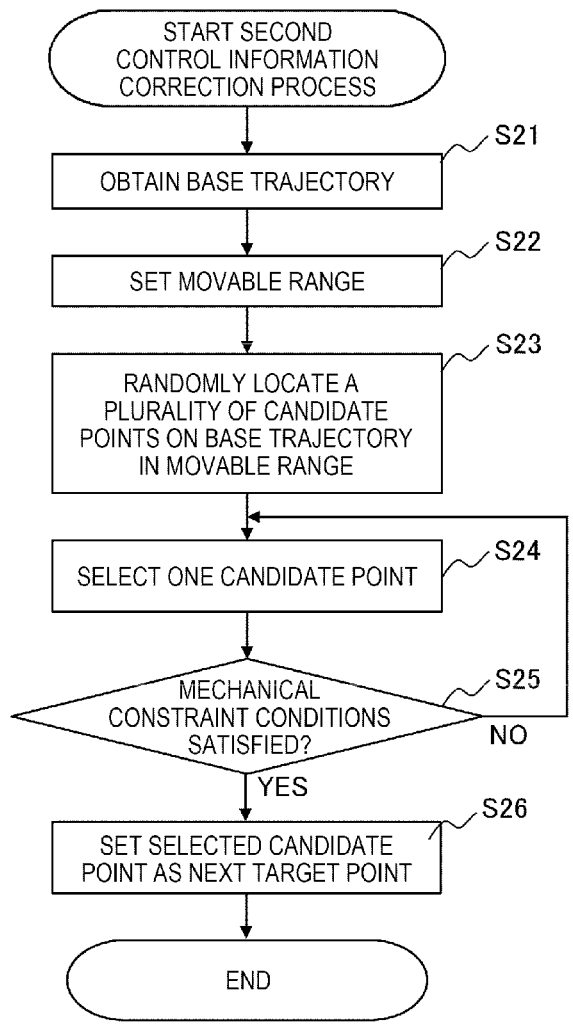

[FIG. 11]
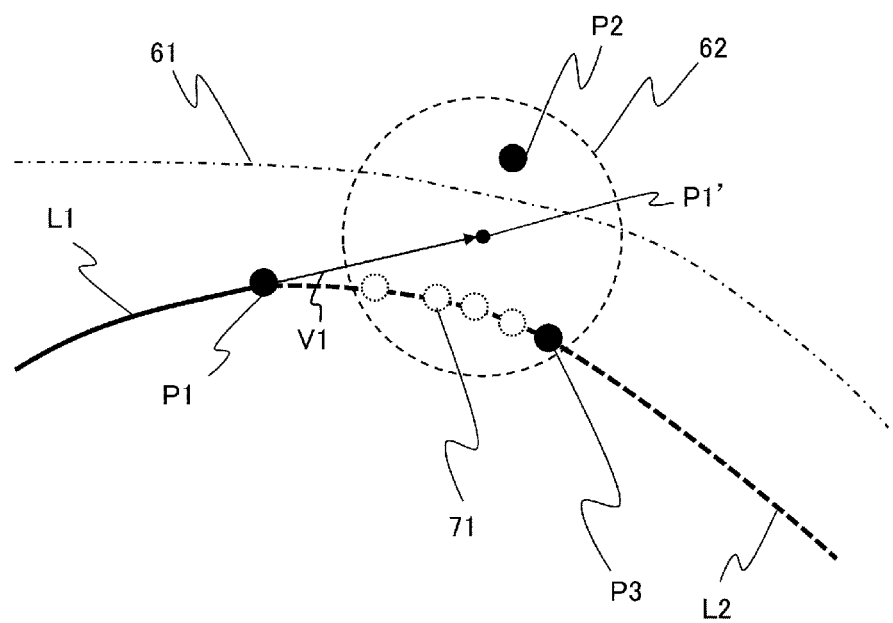

[FIG. 12]
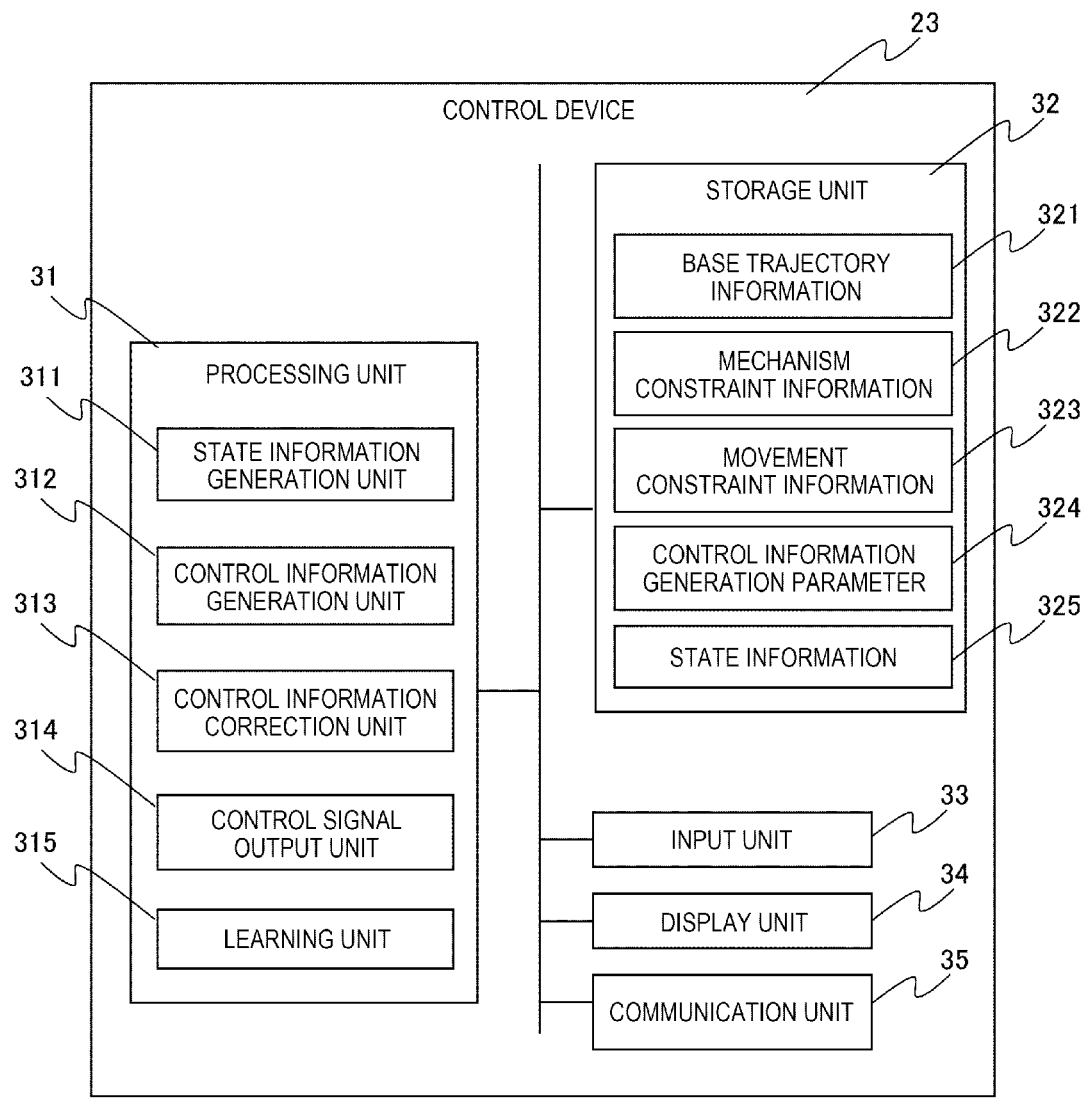

[FIG. 13]
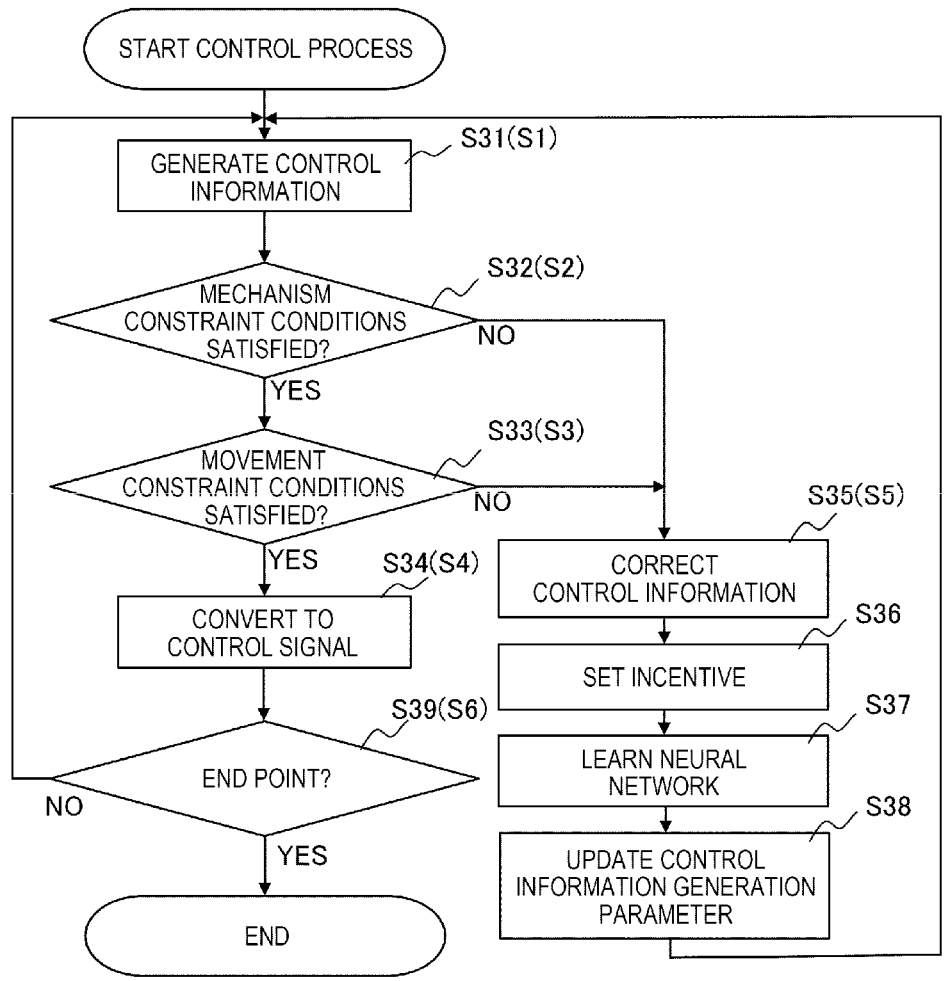

[FIG. 14]
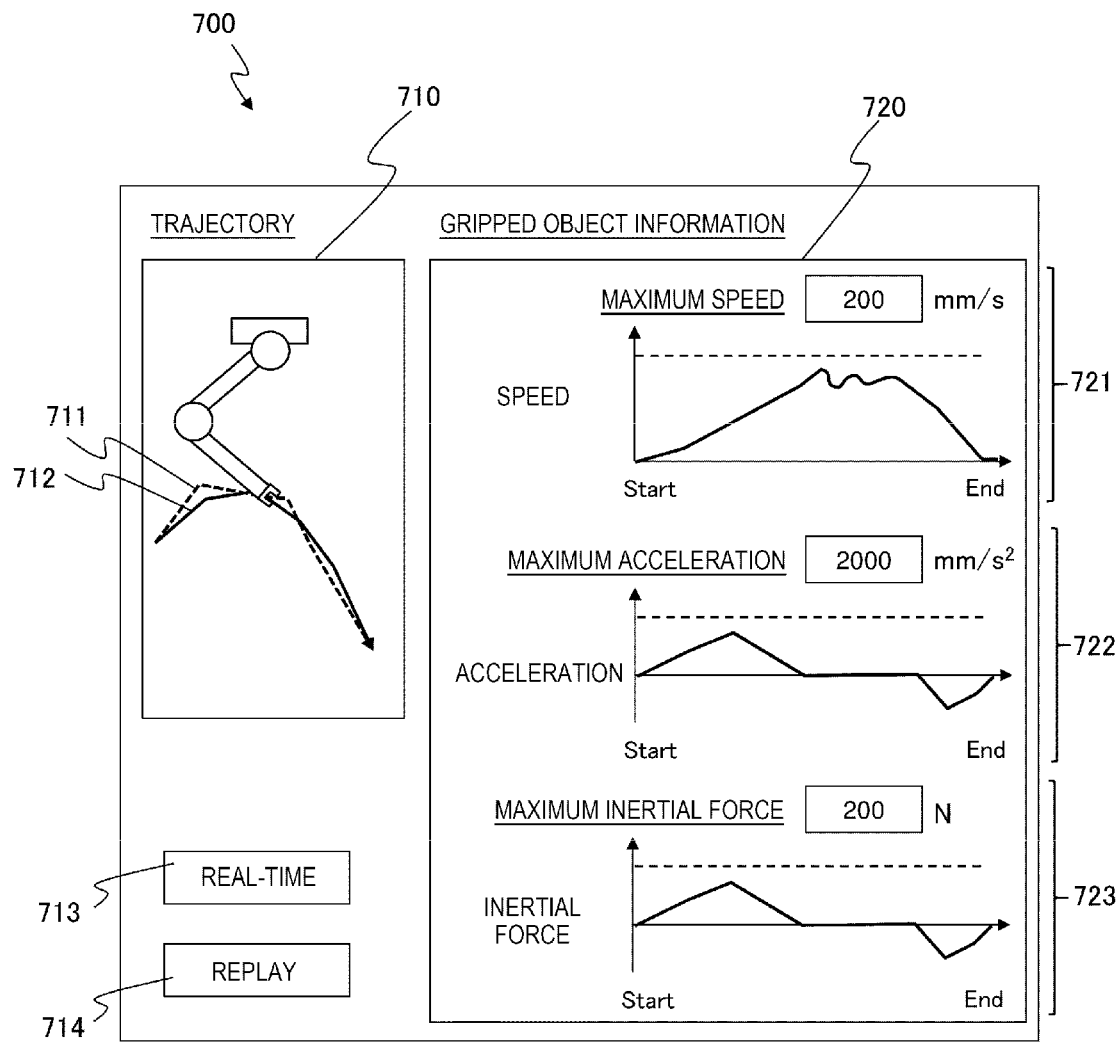

CONTROL DEVICE, CONTROL METHOD, AND ROBOT SYSTEM

TECHNICAL FIELD

The present invention relates to a control device, a control method, and a robot system. The invention claims priority of Japanese Patent Application number 2019-213975, filed on Nov. 27, 2019, the content of which incorporated herein by reference for the designated countries where incorporation by reference of literatures is permitted.

BACKGROUND ART

As a method for controlling a robot, for example, PTL 1 describes a technique of actually operating a robot and automatically adjusting a size of an entire speed profile so that the robot is operated at a maximum speed within a range in which a motor load does not exceed an upper limit value.

In addition, for example, PTL 2 describes a technique of changing a gripping posture with respect to a predetermined trajectory and speed profile in consideration of an inertial force applied to a gripped object.

CITATION LIST

Patent Literature

PTL 1: JP-A-2015-168053
PTL 2: JP-A-2005-1055

In the technique disclosed in PTL 1, since the force applied to the gripped object is not taken into consideration, it is unavoidable that the gripped object may fall while being moved by the robot. In addition, since the entire speed profile is increased or decreased, the operation may not necessarily be a fastest operation.

In the technique disclosed in PTL 2, an appropriate conveyance posture can be calculated only when weight and a position of the center of gravity of the gripped object are known. However, for example, in a case of handling gripped objects having various weights or biased positions of the center of gravity, such as a package handled by a home delivery company, an appropriate conveyance posture cannot be calculated, and it is unavoidable that the gripped objects may fall.

SUMMARY OF INVENTION

Technical Problem

The invention is made in view of the above problems, and an object of the invention is to enable various gripped objects having different sizes, weights, centers of gravity, and the like to be continuously and stably moved at a high speed.

Solution to Problem

The present application includes a plurality of means for solving at least a part of the above problem, and examples thereof are as follows.

In order to solve the above problem, a control device according to an embodiment of the invention includes: a state information generation unit configured to generate and update state information on a robot and a gripped object; and a control information generation unit configured to generate, based on the state information and a base trajectory generated in advance on which the robot is configured to move the gripped object from a start point to an end point, control information for controlling the robot.

Advantageous Effect

The invention can continuously and stably move various gripped objects having different sizes, weights, centers of gravity, and the like at a high speed.

Problems, configurations, and effects other than those described above will become apparent based on the following description of embodiments.

BRIEF DESCRIPTION OF DRAWINGS

FIG. 1 is a diagram showing a configuration example of a robot system according to an embodiment of the invention.

FIG. 2 is a diagram showing a configuration example of a control device.

FIG. 3 is a diagram showing an example of a neural network for realizing an information generation unit.

FIG. 4 is a diagram showing an example of base trajectory information.

FIG. 5 is a diagram showing an example of mechanism constraint information.

FIG. 6 is a diagram showing an example of movement constraint information.

FIG. 7 is a flowchart illustrating an example of a control process performed by a control device.

FIG. 8 is a flowchart illustrating an example of a first control information correction process.

FIG. 9 is a diagram illustrating an example of the first control information correction process.

FIG. 10 is a flowchart illustrating another example of a second control information correction process.

FIG. 11 is a diagram illustrating the other example of the second control information correction process.

FIG. 12 is a diagram showing a modification of the control device.

FIG. 13 is a flowchart illustrating an example of a control process performed by the modification of the control device.

FIG. 14 is a diagram showing a display example of an operation screen.

DESCRIPTION OF EMBODIMENTS

Hereinafter, an embodiment according to the invention will be described with reference to the drawings. The same components are denoted by the same reference symbols in principle throughout all the drawings illustrating the embodiment, and the repetitive description thereof will be omitted. In addition, in the following embodiments, it is needless to say that elements (including element steps and the like) are not necessarily essential unless otherwise particularly specified or clearly considered as essential in principle. It is needless to say that expressions "formed of A", "made of A", "having A", and "including A" do not exclude elements other than A unless it is clearly stated that A is the only element. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle.

Configuration Example of Robot System 1 According to Embodiment of Invention

FIG. 1 shows a configuration example of a robot system 1 according to the embodiment of the invention.

The robot system 1 includes a robot 10, a work instruction device 21, a trajectory generation device 22, an imaging device 23, and a control device 24.

The robot 10 moves a gripped object T from a start point to an end point in accordance with a control signal input from the control device 24. The number of arms, the number of shafts, and an operation mechanism of the robot 10 are not limited to the shown example, and are optional.

The robot 10 includes a plurality of links 11, a hand 12, a force sensor 13, and an acceleration sensor 14.

The plurality of links 11 are connected via joints each including a driving motor. The hand 12 is attached to a distal end of the link 11, and can grip the gripped object T. The robot 10 can move the hand 12 by driving the driving motor of each joint in accordance with the control signal from the control device 24. In addition, the robot 10 constantly generates robot state information including an angle, an angular speed, an angular acceleration, a driving motor torque, a driving motor current value, and a distance to an end point of each joint, and outputs the robot state information to the control device 24.

The force sensor 13 is attached to a position on the distal end where the link 11 and the hand 12 are connected to each other, measures a force applied to the hand 12, and outputs the force to the control device 24. The attachment position of the force sensor 13 is not limited to the above example, and for example, the force sensor 13 may be attached to a finger or a nail of the hand 12.

The acceleration sensor 14 is attached to the hand 12, measures an acceleration of the hand 12, and outputs the acceleration to the control device 24.

An acceleration sensor 15 is attached to the gripped object T moved by the robot 10 or a tray (not shown) on which the gripped object T is placed. The acceleration sensor 15 measures an acceleration of the gripped object T and outputs the acceleration to the control device 24.

As the force sensor 13 and the acceleration sensors 14 and 15, commercially available general sensing devices can be used.

The work instruction device 21 gives a work instruction to the trajectory generation device 22 based on an input from a user. Specifically, for example, an initial position (start point) and a movement destination (end point) of the gripped object T are output to the trajectory generation device 22.

The trajectory generation device 22 determines, based on the work instruction, a base trajectory serving as a basic movement path of the hand 12 in a work of moving the gripped object T from the start point to the end point, generates base trajectory information 321 (FIG. 2) including coordinates, a movement speed, and the like of the base trajectory, and outputs the base trajectory information 321 to the control device 24. However, on the base trajectory determined here, the hand 12 can be moved from the start point to the end point, and the base trajectory is not necessarily an optimal path when various gripped objects T are moved. In other words, the base trajectory is a path in which there is room for optimization.

The imaging device 23 captures an image of the robot 10 moving the gripped object T, and analyzes the captured image obtained as a result, thereby generating gripped object information including a position, a speed, an acceleration, and the like of the gripped object T, and outputting the gripped object information to the control device 24. However, the captured image may be output from the imaging device 23 to the control device 24, and in the control device 24, the captured image may be analyzed to generate the gripped object information including the position, the speed, the acceleration, and the like of the gripped object T.

The control device 24 generates control information for the robot 10 based on the base trajectory information 321 generated by the trajectory generation device 22, the robot state information from the robot 10, the outputs of the force sensor 13 and the acceleration sensors 14 and 15, and the gripped object information from the imaging device 23. The control information generated here includes, for example, a next target angle, angular speed, and angular acceleration of a control shaft of the robot 10, a torque and a driving current of driving motor of a joint of the robot 10, and a next target coordinate, speed, and acceleration of the gripped object T.

Configuration Example of Control Device 24

Next, FIG. 2 shows a configuration example of the control device 24. The control device 24 includes, for example, a general computer such as a personal computer. The control device 24 includes a processing unit 31, a storage unit 32, an input unit 33, a display unit 34, and a communication unit 35.

The processing unit 31 includes a central processing unit (CPU) of a computer and integrally controls the entire control device 24. In addition, the processing unit 31 realizes a state information generation unit 311, a control information generation unit 312, a control information correction unit 313, and a control signal output unit 314 by the CPU executing a predetermined program.

The state information generation unit 311 uses the robot state information from the robot 10, the outputs of the force sensor 13 and the acceleration sensors 14 and 15, and the gripped object information from the imaging device 23 as inputs, generates state information 325, and records the state information 325 in the storage unit 32. In addition, the state information generation unit 311 constantly updates the state information 325.

Based on the base trajectory information 321, a control information generation parameter 324, and the state information 325 that are stored in the storage unit 32, the control information generation unit 312 generates in real time, with respect to a work performed by the robot 10, control information for causing the hand 12 of the robot 10 to move the gripped object T through an optimal path (not necessarily the same as the base trajectory).

The control information generation unit 312 can be realized by, for example, the neural network. However, not limited to the neural network, the control information generation unit 312 may be realized by using a table or a function.

FIG. 3 shows an example of a neural network 50 for realizing the control information generation unit 312.

The neural network 50 includes an input layer 51, an intermediate layer 52, and an output layer 53. Values of items of the base trajectory information 321 and the state information 325 are input to the input layer 51. In the intermediate layer 52, a predetermined operation (for example, multiplication of a weighting factor and addition of a bias value) is performed on the input values in each node. The output layer 53 outputs the input values from the intermediate layer 52 as control information (for example, a next target coordinate, angle of each joint, angular speed, and angular acceleration, a torque of a driving motor, a control current of the driving motor, and the like).

The description returns to FIG. 2. The control information correction unit 313 corrects the control information based on mechanism constraint information 322 and movement constraint information 323.

The control signal output unit 314 converts the control information generated by the control information generation unit 312 or the control information corrected by the control information correction unit 313 into a control signal for the robot 10. The converted control signal is output to the robot 10 via the communication unit 35.

The storage unit 32 includes a memory and a storage of a computer. The storage unit 32 stores the base trajectory information 321, the mechanism constraint information 322, the movement constraint information 323, the control information generation parameter 324, and the state information 325. In addition, the storage unit 32 is used as a work area of the processing unit 31, the control information generation unit 312 realized by the processing unit 31, or the like.

The base trajectory information 321 is generated by the trajectory generation device 22. The mechanism constraint information 322 is information indicating structural constraint conditions of the robot 10 and surrounding environment thereof. The movement constraint information 323 includes information indicating constraint conditions relating to movement of the robot 10. The mechanism constraint information 322 and the movement constraint information 323 are input by a user and the like in advance.

The control information generation parameter 324 is parameters (a weight coefficient, a bias value, or the like) of each node in the neural network that realizes the control information generation unit 312, and is stored in the storage unit 32 in advance. The state information 325 is information indicating a current state of the robot 10 and the gripped object T, is generated by the state information generation unit 311, and is stored in the storage unit 32.

The input unit 33 includes input devices such as a keyboard, a mouse, and a touch panel of the computer. In addition, the input unit 33 may include a microphone (not shown) that acquires a voice of a user and a voice recognition module (not shown) that recognizes the voice of the user. The input unit 33 receives inputs of the mechanism constraint information 322 and the movement constraint information 323 from the user and outputs the inputs to the processing unit 31.

The display unit 34 includes a display, a projector, a head-mounted display, and the like, and displays an operation screen 700 (FIG. 14) or the like. The communication unit 35 includes a communication module of the computer, and is connected to the robot 10, the trajectory generation device 22, and the imaging device 23 to communicate various types of information.

Further, for example, a printer that prints the operation screen 700 or the like displayed on the display unit 34 on a sheet or the like may be connected to the control device 24.

Next, FIG. 4 shows an example of the base trajectory information 321. In the base trajectory information 321, for example, a coordinate array (Nos. 1 to 6 in the same figure) in which time-series positions and postures when the hand 12 is moved are expressed in a Cartesian coordinate system, and a joint angle array (Nos. 7 to 11 in the same figure) in which a time-series joint angle of the robot 10 is expressed in a joint angle system are recorded. In fact, one of the coordinate array and the joint angle array may be recorded.

FIG. 5 shows an example of the mechanism constraint information 322. The mechanism constraint information 322 is classified into robot model information, environment model information, and gripped object information as large items.

The robot model information of the large items is classified into the number of links, a link dimension, link connection information, a joint movable range, and link model information as medium items. In the number of links, the number of links of the robot 10 is recorded. In the link dimension, a dimension is recorded for each link. In the link connection information, a connected link pair and a connection form are recorded for each joint. In the movable joint movable range, a movable range is recorded for each joint. In the link model information, mesh data representing a shape of each joint is recorded.

In the environment model information of the large items, coordinates and mesh data representing a shape of a workbench model are recorded.

The gripped object information of the large items is classified into gripped object model information and posture constraint information as medium items. In the gripped object model information, a shape name of the gripped object and mesh data representing a shape of the gripped object are recorded. In the posture constraint information, an inclination angle allowed for the gripped object is recorded.

FIG. 6 shows an example of the movement constraint information 323. The movement constraint information 323 is classified into a kinetic constraint condition and a mechanical constraint condition as large items.

The kinetic constraint condition of the large items is classified into a robot maximum angular speed, a robot maximum angular acceleration, a gripped object maximum speed, and a gripped object maximum acceleration as medium items. In the robot maximum angular speed, a maximum angular speed allowed for each joint is recorded. In the robot maximum angular acceleration, a maximum angular acceleration allowed for each joint is recorded. In the gripped object maximum speed, a maximum speed allowed for the gripped object is recorded. In the gripped object maximum acceleration, a maximum acceleration allowed for the gripped object is recorded.

The mechanical constraint condition of the large items is classified into a gripped object maximum inertial force, a hand maximum gripping force, a hand maximum reaction force, a maximum torque, and a maximum current as medium items. In the gripped object maximum inertial force, a maximum inertial force allowed for the gripped object T is recorded. In the hand maximum gripping force, a maximum reaction force with respect to the hand 12 is recorded. In the maximum torque, a maximum torque of the driving motor is recorded for each joint. In the driving motor maximum current, a maximum current of the driving motor for each joint is recorded.

Control Process Performed By Control Device 24

Next, FIG. 7 is a flowchart illustrating an example of a control process performed by the control device 24.

The control process is executed every time a work of moving the gripped object T from a predetermined start point to an end point using the robot 10 is performed.

As a premise of the control process, the base trajectory information 321, the mechanism constraint information 322, the movement constraint information 323, the control information generation parameter 324, and the state information 325 are already recorded in the storage unit 32, and the state information 325 is constantly updated by the state information generation unit 311.

First, the control information generation unit 312 generates, based on the base trajectory information 321, the control information generation parameter 324, and the state information 325 that are stored in the storage unit 32, control information of causing the hand 12 of the robot 10 to move the gripped object T through an optimal path (step S1). Specifically, each value of the base trajectory information 321 and the state information 325 can be input to a neural network defined by the control information generation parameter 324 to obtain the control information.

Next, the control information correction unit 313 determines whether the control information generated by the control information generation unit 312 satisfies mechanism constraint conditions (various constraint conditions recorded in the mechanism constraint information 322) (step S2).

Here, in a case where the control information correction unit 313 determines that the control information satisfies the mechanism constraint conditions (YES in step S2), the control information correction unit 313 determines whether the control information satisfies movement constraint conditions (various constraint conditions recorded in the movement constraint condition 323) (step S3). Then, in a case where the control information correction unit 313 determines that the control information satisfies the movement constraint conditions (YES in step S3), the control signal output unit 314 converts the control information satisfying the mechanism constraint conditions and the movement constraint conditions into a control signal for the robot 10, and outputs the control signal to the robot 10 via the communication unit 35 (step S4).

Next, the control information generation unit 312 determines whether a current position of the hand 12 is the end point (step S6). Here, in a case where the control information generation unit 312 determines that the current position of the hand 12 is not the end point (NO in step S6), the process returns to step S1, and step S1 and subsequent steps are repeated. In contrast, in a case where the control information generation unit 312 determines that the current position of the hand 12 is the end point (YES in step S6), the control process is ended.

On the other hand, in a case where the control information correction unit 313 determines that the control information does not satisfy the mechanism constraint conditions (NO in step S2) or determines that the control information does not satisfy the movement constraint conditions (NO in step S3), the control information correction unit 313 corrects the control information (step S5). Details of the control information correction process in step S5 will be described below with reference to FIGS. 8 to 11. Thereafter, the process returns to step S2, and step S2 and subsequent steps are repeated.

According to the control process described above, even if a size, weight, center of gravity, and the like of the gripped object T are different for each work, since the control information is generated in real time for each work, various gripped objects T can be continuously and stably moved at a high speed. Accordingly, an improvement in operation rate and work efficiency of the robot 10, and a reduction in damage to the gripped objects T can be realized.

First Control Information Correction Process Performed by Control Information Correction Unit 313

Next, FIG. 8 is a flowchart illustrating an example of a first control information correction process performed by the control information correction unit 313. FIG. 9 is a diagram illustrating an example of the first control information correction process.

In FIG. 9, a point P1 is a current position (hereinafter, referred to as a current position P1) of the hand 12. A curve L1 is a trajectory (hereinafter, referred to as a trajectory L1) along which the hand 12 has moved to the current position P1. A speed of the hand 12 at the current position P1 is V1. A point P2 is a next target point (hereafter, referred to as a target point P2) at which the mechanism constraint conditions at this time are not satisfied. A curve 61 represents a geometric boundary line (hereinafter, referred to as a geometric boundary line 61) based on the mechanism constraint conditions, and in the figure, a lower side of the geometric boundary line 61 is a region satisfying the mechanism constraint conditions, and an upper side thereof is a region not satisfying the mechanism constraint conditions. Specifically, the geometric boundary line 61 is a limit line of a movable range of the robot 10, a boundary line of the movable range in which the robot 10 interferes with an obstacle, or the like.

The first control information correction process is for determining a next target point P3 that satisfies the mechanism constraint conditions, instead of the next target point P2 that does not satisfy the mechanism constraint conditions in the current control information. The robot 10 can move the gripped objects T faster as the next target point P3 moving from the current position P1 during a control period $\Delta t$ is farther from the current position P1.

First, the control information correction unit 313 set a movable range 62 (step S11). Specifically, the control information correction unit 313 determines a maximum acceleration $\alpha_{MAX}$ based on the kinematics constraint conditions of the movement constraint information 323, and sets, as the movable range 62, a circle that is centered on a point P1'=(P1+V1·$\Delta t$) moving from the current position P1 during the control period $\Delta t$ at the speed V1 and has a radius of $0.5\alpha_{MAX}(\Delta t)^2$.

The maximum acceleration $\alpha_{MAX}$ varies depending on an acceleration direction due to an influence of a posture and a gravity of the robot 10, and the like, but here, in order to simplify the description, the maximum acceleration $\alpha_{MAX}$ can be determined based on the kinematics constraint conditions regardless of the acceleration direction.

Next, the control information correction unit 313 randomly locates a plurality of candidate points (circles indicated by dotted lines in the figure) 63 in the movable range 62 (step S12). Next, the control information correction unit 313 selects points that satisfy the mechanism constraint conditions, that is, candidate points 63 located below the geometric boundary line 61, from the plurality of candidate points 63, one by one in a descending order of distances from the current position P1 (step S13).

Next, the control information correction unit 313 determines whether (various values at the time of moving to) the selected candidate point 63 satisfies mechanical constraints of the movement constraint conditions (step S14). Here, in a case where the control information correction unit 313 determines that the selected candidate point 63 does not satisfy the mechanical constraint conditions (NO in step S14), the process returns to step S13, and step S13 and subsequent steps are repeated. That is, a candidate point 63 secondly farthest from the current position P1 is selected, and the control information correction unit 313 determines whether the candidate point 63 satisfies the mechanical constraints.

In contrast, in a case where the control information correction unit 313 determines that the selected candidate point 63 satisfies the mechanical constraint conditions (YES in step S14), the control information correction unit 313 sets the selected candidate point 63 as the next target point P3 (step S15). Thus, the first control information correction process is ended.

According to the first control information correction process described above, the control information can be corrected to satisfy the mechanism constraint conditions and the movement constraint conditions. In addition, in the first control information correction process, among the plurality of candidate points 63, the points satisfying the mechanism constraint conditions are selected in the descending order of distances from the current position P1, and thus a candidate point 63 that satisfies the mechanism constraint conditions and the movement constraint conditions and is farthest from the current position P1 can be set earlier as the next target point P3. However, the first control information correction process remains a possibility of falling into a local solution.

Second Control Information Correction Process Performed by Control Information Correction Unit 313

Next, FIG. 10 is a flowchart illustrating an example of a second control information correction process performed by the control information correction unit 313. FIG. 11 is a diagram illustrating an example of the second control information correction process.

In FIG. 11, portions same as those in FIG. 9 are denoted by the same reference numerals, and the description thereof will be omitted. A cure L2 is a base trajectory (hereafter, referred to as a base trajectory L2) generated by the trajectory generation device 22.

Similar to the above first control information correction process, the second control information correction process is for determining a next target point P3 that satisfies the mechanism constraint conditions, instead of the next target point P2 that does not satisfy the mechanism constraint conditions in the current control information. The robot 10 can move the gripped object T faster as the next target point P3 moving from the current position P1 during the control period Δt is farther from the current position P1.

First, the control information correction unit 313 obtains the base trajectory information 321 from the storage unit 32 (step S21). Next, the control information correction unit 313 set the movable range 62 (step S22).

Next, the control information correction unit 313 randomly locates a plurality of candidate points (circles indicated by dotted lines in the figure) 71 on a base trajectory L2 inside the movable range 62 (step S23). Next, the control information correction unit 313 selects the plurality of candidate points 71 one by one in a descending order of distances from the current position P1 (step S24).

Next, the control information correction unit 313 determines whether (various values at the time of moving to) the selected candidate point 71 satisfies mechanical constraints of the movement constraint conditions (step S25). Here, in a case where the control information correction unit 313 determines that the selected candidate point 71 does not satisfy the mechanical constraint conditions (NO in step S25), the process returns to step S24, and step S24 and subsequent steps are repeated. That is, a candidate point 71 secondly farthest from the current position P1 is selected, and the control information correction unit 313 determines whether the candidate point 71 satisfies the mechanical constraints.

In contrast, in a case where the control information correction unit 313 determines that the selected candidate point 71 satisfies the mechanical constraint conditions (YES in step S25), the control information correction unit 313 sets the selected candidate point 71 as the next target point P3 (step S26). Thus, the second control information correction process is ended.

According to the second control information correction process described above, the same action and effect as those of the first control information correction process can be obtained. Further, according to the second control information correction process, since the next target point P3 is selected from the candidate points 71 located on the base trajectory L2, in addition to an effect that interference of an obstacle or the like can be easily avoided, an effect that the second control information correction process does not fall into a local solution since the base trajectory L2 ensures a shortest path of the entire trajectory can be obtained.

Modification of Control Device 24

Next, FIG. 12 shows a modification of the control device 24. The modification is obtained by adding a learning unit 315 to the configuration example shown in FIG. 2. Units other than the learning unit 315 in the modification are the same as those in FIG. 2, and are denoted by the same reference numerals, and description thereof will be omitted.

The learning unit 315 performs, based on a correction result of control information obtained by the control information correction unit 313, machine learning of the neural network that realizes the control information generation unit 312.

Control Process Performed By Modification of Control Device 24

Next, FIG. 13 is a flowchart illustrating an example of a control process performed by the modification of the control device 24.

The control process includes a learning process of the neural network 50 that realizes the control information generation unit 312, and has a large processing load, and therefore, the control process is executed every predetermined period (for example, every time the robot 10 performs the work 100 times, after the robot 10 is operated for one month, or the like).

However, as long as a computing capability of the computer forming the control device 24 is very high and the learning process of the neural network 50 can be performed in real time in parallel with the work performed by the robot 10, similar to the control process in FIG. 7, the control process may be performed every time the work performed by the robot 10 is performed.

Also in the control process, as a premise, the base trajectory information 321, the mechanism constraint information 322, the movement constraint information 323, the control information generation parameter 324, and the state information 325 are already recorded in the storage unit 32, and the state information 325 is constantly updated by the state information generation unit 311.

Since steps S31 to S35 and S39 in the control process are the same as steps S1 to S6 in the control process in FIG. 7, description thereof will be omitted.

After the correction information is corrected in step S35, the learning unit 315 sets an incentive for each item of the control information based on the correction result obtained by the control information correction unit 313 (step S36). Specifically, for each item of the control information before correction, a negative incentive is set in a case where at least one of the mechanism constraint conditions and the movement constraint conditions is not satisfied, and a positive incentive is set in a case where the mechanism constraint conditions and the movement constraint conditions are satisfied.

Next, the learning unit 315 performs the machine learning (also referred to as reinforcement learning) of the neural network 50 based on the set incentives and the corrected control information (step S37), and updates the control information generation parameter 324 of the storage unit 32 by overwriting a weighting factor, a bias, and the like in each node of the neural network 50 after learning (step S38). Thereafter, the process returns to step S31, and step S31 and subsequent steps are repeated.

According to the control process described above, the same action and effect as those of the control process in FIG. 7 can be obtained. In addition, according to the control process, since the neural network 50 is learned, control information satisfying the mechanism constraint conditions and the movement constraint conditions can be generated more quickly in the control process in FIG. 7 executed next time.

Display Example of Operation Screen 700

Next, FIG. 14 shows a display example of the operation screen 700 displayed on the display unit 34 of the control device 24.

The operation screen 700 is provided with a trajectory display region 710, a real-time button 713, a replay button 714, and a gripped object information display region 720.

In the trajectory display region 710, a base trajectory 711 drawn by a broken line and an actual trajectory 712 drawn by a solid line are displayed using a three-dimensional model or the like. The actual trajectory 712 is a path of the hand 12 corresponding to the control information.

When the real-time button 713 is operated by a user, a real-time operation of the robot 10 can be displayed in the trajectory display region 710. When the replay button 714 is operated by the user, an operation of the robot 10 that has already ended can be redisplayed in the trajectory display region 710.

The gripped object information display region 720 is provided with a speed display region 721, an acceleration display region 722, and an inertial force display region 723.

The speed display region 721 displays a time-series change of a speed of the gripped object T. In addition, in the speed display region 721, the user can input a maximum speed of the gripped object T. The acceleration display region 722 displays a time-series change of an acceleration of the gripped object T. In addition, in the acceleration display region 722, the user can input a maximum acceleration of the gripped object T. The inertial force display region 723 displays a time-series change of an inertial force of the gripped object T. In addition, in the inertial force display region 723, the user can input a maximum inertial force of the gripped object T. Input values of the maximum speed and the maximum acceleration of the gripped object T input by the user are reflected in the kinematics constraint conditions of the movement constraint information 323. An input value of the maximum inertial force of the gripped object T input by the user is reflected in the mechanical constraint conditions of the movement constraint information 323.

The invention is not limited to the embodiments described above, and various modifications can be made. For example, the embodiments described above have been described in detail for easy understanding of the invention, and are not necessarily limited to those including all the configurations described above. Further, a part of the configuration of an embodiment may be replaced with or added to the configuration of another embodiment.

In addition, a part or all of the above configurations, functions, processing units, processing methods, and the like may be implemented by hardware, for example, by designing an integrated circuit. In addition, each of the above configurations, the functions, and the like may be implemented by software by a processor interpreting and executing a program that implements respective functions. Information such as a program, a table, and a file for implementing each of the functions can be stored in a recording device such as a memory, a hard disk, or a solid state drive (SSD), or in a recording medium such as an IC card, an SD card, or a DVD. In addition, control lines or information lines that are assumed to be necessary for the sake of description are shown, and not all the control lines or information lines are necessarily shown in a product. In practice, it may be considered that almost all configurations are connected to each other.

REFERENCE SIGN LIST 1 robot system
10 robot
11 link
12 hand
13 force sensor
14 acceleration sensor
15 acceleration sensor
21 work instruction device
22 trajectory generation device
23 imaging device
24 control device
31 processing unit
311 state information generation unit
312 control information generation unit
313 control information correction unit
314 control signal output unit
315 learning unit
32 storage unit
321 base trajectory information
322 mechanism constraint information
323 movement constraint information
324 control information generation parameter
325 state information
33 input unit
34 display unit
35 communication unit
50 neural network
51 input layer
52 intermediate layer
53 output layer
61 geometric boundary line
62 movable range
63, 71 candidate point
700 operation screen
710 trajectory display region
711 base trajectory 712 actual trajectory
713 real-time button
714 replay button
720 gripped object information display region
721 speed display region
722 acceleration display region
723 inertial force display region

The invention claimed is:
1. A control device, comprising:
a storage unit having a memory and a storage device and being configured to store mechanism constraint information and movement constraint information; and
a processor which when executing a program configures the processor to:
generate and update state information on a robot and a gripped object;
generate, based on the state information and a base trajectory generated in advance on which the robot is configured to move the gripped object from a start point to an end point, control information for controlling the robot;
correct, when the generated control information does not satisfy at least one of conditions represented by the mechanism constraint information and the movement constraint information, the control information;
calculate a movable range based on movement constraint information determined according to the characteristics of the robot and/or the gripped object at a current position P1, and to correct the control information when a next target point P2 based on the control information does not exist within the movable range or does not satisfy the mechanism constraint information, the movable range being a circle that is centered on a point P1'=(P1+V1·Δt) moving from the current position P1 during a control period Δt at a speed V1 and has a predetermined radius based on a maximum acceleration of the robot;
correct, when the next target point P2 in the generated control information does not satisfy the at least one condition, the control information by changing a candidate point which is farthest from the current position P1, from among a plurality of candidate points located in a range in which the control information satisfies the conditions, to the next target point P2; and
control the robot to move the gripped object based on the control information.
2. The control device according to claim 1, wherein the processor is further configured to:
correct, when a next target point in the generated control information does not satisfy the at least one condition, the control information by changing a candidate point which is farthest from a current position from among a plurality of candidate points randomly located on the base trajectory in a range in which the control information satisfies the conditions to the next target point.
3. The control device according to claim 1, wherein the processor is further configured to:
input the base trajectory and the state information to a neural network and output the control information.
4. The control device according to claim 3, wherein the processor is further configured to:
perform machine learning of the neural network based on a correction result obtained by the control information correction unit.
5. The control device according to claim 1, wherein the processor is further configured to:
generate and constantly update the state information including at least one of an inertial force applied to the gripped object, and a position, a speed, and an acceleration of the gripped object.
6. The control device according to claim 1, wherein the processor is further configured to:
generate the control information including at least one of a next target angle, angular speed, and angular acceleration of a control shaft of the robot, a torque and a driving current of a driving motor of a joint of the robot, and a next target coordinate, speed, and acceleration of the gripped object T.
7. A control method performed by a control device for controlling a robot, comprising the steps of:
generating and updating state information on a robot and a gripped object;
obtaining a base trajectory generated in advance on which the robot is configured to move the gripped object from a start point to an end point;
generating, based on the base trajectory and the state information, control information for controlling the robot;
correcting, when the generated control information does not satisfy at least one of conditions represented by the mechanism constraint information and the movement constraint information, the control information;
calculate a movable range based on movement constraint information determined according to the characteristics of the robot and/or the gripped object at a current position P1, and to correct the control information when a next target point P2 based on the control information does not exist within the movable range or does not satisfy the mechanism constraint information, the movable range being a circle that is centered on a point P1'=(P1+V1·Δt) moving from the current position P1 during a control period Δt at a speed V1 and has a predetermined radius based on a maximum acceleration of the robot;
correcting, when the next target point P2 in the generated control information does not satisfy the at least one condition, the control information by changing a candidate point which is farthest from the current position P1, from among a plurality of candidate points located in a range in which the control information satisfies the conditions, to the next target point P2; and
controlling the robot to move the gripped object based on the control information.
8. A robot system, comprising:
a robot configured to move a gripped object;
a trajectory generation device configured to store a base trajectory on which the robot is configured to move the gripped object from a start point to an end point; and
a control device including:
a storage unit having a memory and a storage device and being configured to store at least one of mechanism constraint information and movement constraint information; and
a processor which when executing a program configures the processor to:
generate and update state information on the robot and the gripped object, and
generate, based on the base trajectory and the state information, control information for controlling the robot,
correct, when the generated control information does not satisfy at least one of conditions represented by the mechanism constraint information and the movement constraint information, the control information;

calculate a movable range based on movement constraint information determined according to the characteristics of the robot and/or the gripped object at a current position P1, and to correct the control information when a next target point P2 based on the control information does not exist within the movable range or does not satisfy the mechanism constraint information, the movable range being a circle that is centered on a point $P1'=(P1+V1 \cdot \Delta t)$ moving from the current position P1 during a control period $\Delta t$ at a speed V1 and has a predetermined radius based on a maximum acceleration of the robot;

correct, when the next target point P2 in the generated control information does not satisfy the at least one condition, the control information by changing a candidate point which is farthest from the current position P1, from among a plurality of candidate points located in a range in which the control information satisfies the conditions, to the next target point P2; and control the robot to move the gripped object based on the control information.

\* \* \* \* \*